US012183106B1

(12) United States Patent
Xylouris

(10) Patent No.: US 12,183,106 B1
(45) Date of Patent: Dec. 31, 2024

(54) METHODS AND APPARATUS FOR EXTRACTING DATA FROM A DOCUMENT BY ENCODING IT WITH TEXTUAL AND VISUAL FEATURES AND USING MACHINE LEARNING

(71) Applicant: Greenhouse Software, Inc., New York, NY (US)

(72) Inventor: Triantafyllos Xylouris, Pefki (GR)

(73) Assignee: Greenhouse Software, Inc., New York, NY (US)

( * ) Notice: Subject to any disclaimer, the term of this patent is extended or adjusted under 35 U.S.C. 154(b) by 0 days.

(21) Appl. No.: 18/759,395

(22) Filed: Jun. 28, 2024

Related U.S. Application Data

(60) Provisional application No. 63/511,553, filed on Jun. 30, 2023.

(51) Int. Cl.
*G06V 30/414* (2022.01)
*G06N 20/00* (2019.01)
(Continued)

(52) U.S. Cl.
CPC ........... *G06V 30/414* (2022.01); *G06N 20/00* (2019.01); *G06V 30/133* (2022.01); *G06V 30/18* (2022.01);
(Continued)

(58) Field of Classification Search
CPC ...... G06V 30/18; G06V 30/41; G06V 30/133; G06V 30/412; G06V 30/414; G06V 30/416; G06F 40/30; G06N 20/00
See application file for complete search history.

(56) References Cited

U.S. PATENT DOCUMENTS 6,662,190 B2   12/2003   Bax et al.
10,769,381 B2   9/2020   Tacchi et al.
(Continued)

FOREIGN PATENT DOCUMENTS

EP          4141818 A1    3/2023
WO    WO-2013165923 A1   11/2013

OTHER PUBLICATIONS

Bhor et al., "Resume parser using natural language processing techniques". Int. J. Res. Eng. Sci. Jun. 2021; 9(6). 6 pages.
(Continued)

*Primary Examiner* — Daniel G Mariam
(74) *Attorney, Agent, or Firm* — COOLEY LLP

(57) ABSTRACT

An apparatus including a processor caused to receive document images, each including representations of characters. The processor is caused to parse each document image to extract, based on structure type, subsets of characters, to generate a text encoding for that document image. For each document, the processor is caused to extract visual features to generate a visual encoding for that document image, each visual feature associated with a subset of characters. The processor is caused to generate parsed documents, each parsed document uniquely associated with a document image and based on the text and visual encoding for that document image. For each parsed document, the processor is caused to identify sections uniquely associated with section type. The processor is caused to train machine learning models, each machine learning model associated with one section type and trained using a portion of each parsed document associated with that section type.

21 Claims, 5 Drawing Sheets

(51) Int. Cl.
*G06V 30/12* (2022.01)
*G06V 30/18* (2022.01)
*G06V 30/41* (2022.01)
*G06V 30/412* (2022.01)
*G06V 30/416* (2022.01)
*G06F 40/30* (2020.01)

(52) U.S. Cl.
CPC ............ *G06V 30/41* (2022.01); *G06V 30/412* (2022.01); *G06V 30/416* (2022.01); *G06F 40/30* (2020.01)

(56) References Cited

U.S. PATENT DOCUMENTS

| | | |
|---|---|---|
| 11,227,183 B1 | 1/2022 | Connors et al. |
| 11,238,410 B1 | 2/2022 | Wright |
| 11,321,956 B1 * | 5/2022 | Geng .................. G06V 30/414 |
| 11,354,485 B1 * | 6/2022 | O'Gorman ........... G06V 30/414 |
| 2006/0245641 A1 | 11/2006 | Viola et al. |
| 2014/0122355 A1 | 5/2014 | Hardtke et al. |
| 2017/0300565 A1 | 10/2017 | Calapodescu et al. |
| 2019/0147385 A1 | 5/2019 | Narayanaswamy et al. |
| 2021/0012103 A1 | 1/2021 | Bassu et al. |
| 2021/0158302 A1 | 5/2021 | Dangi |
| 2022/0067665 A1 | 3/2022 | Westerheide et al. |
| 2023/0154221 A1 * | 5/2023 | Gu ........................ G06F 18/253 382/156 |

OTHER PUBLICATIONS

Gaur et al., "Semi-supervised deep learning-based named entity recognition model to parse education section of resumes". Neural Computing and Applications. Jun. 2021; 33: 5705-18.

International Search Report and Written Opinion for PCT Application No. PCT/US2024/036198 mailed Oct. 8, 2024, 15 pages.

* cited by examiner

200

201

John W. Smith
202
203 — 2002 Front Range Way Fort Collins, CO 80525
204 — jwsmith@colostate.edu

211

212 — Career Summary

213 — Four years experience in early childhood development with a diverse background in the care of special needs children and adults.

221

222 — Adult Care Experience
- Determined work placement for 150 special needs adult clients. — 223a
- Maintained client databases and records. — 223b
- Coordinated client contact with local health care professionals on a monthly basis. — 223c
- Managed 25 volunteer workers.

224 — Childcare Experience
- Coordinated service assignments for 20 part-time counselors and 100 client families. — 224a
- Oversaw daily activity and outing planning for 100 clients. — 224b
- Assisted families of special needs clients with researching financial assistance and healthcare. — 224c
- Assisted teachers with managing daily classroom activities. — 224d
- Oversaw daily and special student activities. — 224e

231

232 — Employment History

| | | |
|---|---|---|
| 233a — 1999-2002 | Counseling Supervisor, The Wesley Center, Little Rock, Arkansas. | — 234a |
| 233b — 1997-1999 | Client Specialist, Rainbow Special Care Center, Little Rock, Arkansas | — 234b |
| 233c — 1996-1997 | Teacher's Assistant, Cowell Elementary, Conway, Arkansas | — 234c |

241

242 — Education

243 — *University of Arkansas at Little Rock, Little Rock, AR*
- BS in Early Childhood Development (1999) — 244a
- BA in Elementary Education (1998) — 244b
- GPA (4.0 Scale): Early Childhood Development – 3.8, Elementary Education – 3.5, Overall 3.4. — 244c
- Dean's List, Chancellor's List 244d

FIG. 2

METHODS AND APPARATUS FOR EXTRACTING DATA FROM A DOCUMENT BY ENCODING IT WITH TEXTUAL AND VISUAL FEATURES AND USING MACHINE LEARNING

CROSS REFERENCE TO RELATED APPLICATIONS

This application claims priority to provisional U.S. Patent Application No. 63/511,553, filed Jun. 30, 2023, the entire contents of which are incorporated herein by reference.

FIELD

The present disclosure generally relates to the field of machine learning. In particular, the present disclosure is related to methods and apparatus for encoding a document image with textual and visual features and using machine learning to extract relevant data.

BACKGROUND

Object character recognition (OCR) is a tool that can convert text-containing documents having various format documents such as, for example, scanned copies, images, PDF files, etc., into computer readable, editable, and/or searchable format. Staffing and recruiting firms can use OCR to receive and analyze hundreds of resume documents of job candidates. In some implementations, any resume documents can follow a similar structure or format such that computers can learn to identify and extract specific information across a resume document.

Some technologies fail to extract information accurately or consider visual features, such as bolding, font size, color, etc., and therefore rely heavily on user intervention to amend incorrect resume document conversion. Certain phrases or titles can be misinterpreted without the correct context, resulting in inaccurate information extraction or organization. Certain resume documents can be organized in unfamiliar structures or formats. A need exists to determine textual and visual features of individual sections to extract and label information accurately.

SUMMARY

In one or more embodiments, a non-transitory, processor-readable medium stores instructions that when executed by a processor, cause the processor to receive a set of document images each including a set of representations of characters. The processor is further caused to parse each document image from the set of document images to extract subsets of characters from the set of representations of characters to generate a text encoding for that document image. Each subset of characters is associated with a structure type from a set of structure types. For each document image from the set of document images, the processor is further caused to extract a set of visual features to generate a visual encoding for that document image. Each visual feature from the set of visual features is associated with at least one subset of characters from the subsets of characters. The processor is further caused to generate a set of parsed documents, each parsed document from the set of parsed documents uniquely associated with a document image from the set of document images and being based on the text encoding and the visual encoding for that document image. For each parsed document from the set of parsed documents, the processor is further caused to identify a set of sections. Each section from the set of sections uniquely is associated with a section type from a set of section types. The processor is further caused to train a set of machine learning models to produce a set of trained machine learning models. Each machine learning model from the set of machine learning models associated with one section type from the set of section types and trained using a portion of each parsed document that is from the set of parsed documents and that is associated with that section type.

In one or more embodiments, a non-transitory, processor processor-readable medium stores instructions that, when executed by a processor, cause the processor to receive a document image that includes a set of representations of characters. The processor is further caused to parse the document image to extract subsets of characters from the set of representations of characters to generate a text encoding for the document image. Each subset of characters is associated with a structure type from a set of predefined structure types. The processor is further caused to extract a set of visual features based on the text encoding to generate a visual encoding for the document image, each visual feature from the set of visual features associated with at least one subset of characters from the subsets of characters. The processor is further caused to generate a parsed document based on the text encoding and the visual encoding. The processor is further caused to identify a set of sections based on the parsed document. Each section from the set of sections is uniquely associated with a section type from a set of predefined section types. The processor is further caused to execute, for each section from the set of sections, a machine learning model from a set of machine learning models that is uniquely associated with the section type of that section to extract at least a feature from a set of features from the parsed document. Each feature from the set of features is associated with a predefined feature type from a set of predefined feature types. The processor is further caused to generate a structured data file based on the least a feature from the set of features extracted from the parsed document.

In one or more embodiments, an apparatus includes a processor and a memory operatively connected to the processor. The memory stores instructions to cause the processor to receive a set of document images. Each document image from the set of document images includes a set of representations of characters. For each document image from the set of document images, the memory stores instructions to further cause the processor to parse that document image to extract subsets of characters from the set of representations of characters to generate a text encoding for that document image. Each subset of characters from the subsets of characters is associated with a structure type from a set of structure types. The memory stores instructions to further cause the processor to parse each document image from the set of document images to extract subsets of characters from the set of representations of characters to generate a text encoding for that document image, each subset of characters being associated with a structure type from a set of structure types and to generate a text encoding for that document image based on the subsets of characters. For each document image from the set of document images, the memory stores instructions to further cause the processor to extract a set of visual features to generate a visual encoding for that document image, each visual feature from the set of visual features associated with at least one subset of characters from the subsets of characters. The memory stores instructions to further cause the processor to generate a set of parsed documents. Each parsed document from the set of parsed documents is uniquely associated with a document image from the set of document images and based on the text encoding and the visual encoding for that document image. For each parsed document from the plurality of parsed documents, the memory stores instructions to further cause the processor to identify a set of sections. Each section from the set of sections is uniquely associated with a section type from a set of section types. The memory stores instructions to further cause the processor to train a set of machine learning models to produce a set of trained machine learning models. Each machine learning model from the set of machine learning models is associated with one section type from the set of section types and trained using a portion of each parsed document from the set of parsed documents, the portion of each parsed document associated with that section type.

BRIEF DESCRIPTION OF THE DRAWINGS

FIG. 2 is a schematic illustration of a document image with bounding boxes surrounding characters, according to an embodiment.

DETAILED DESCRIPTION

Figure 1:
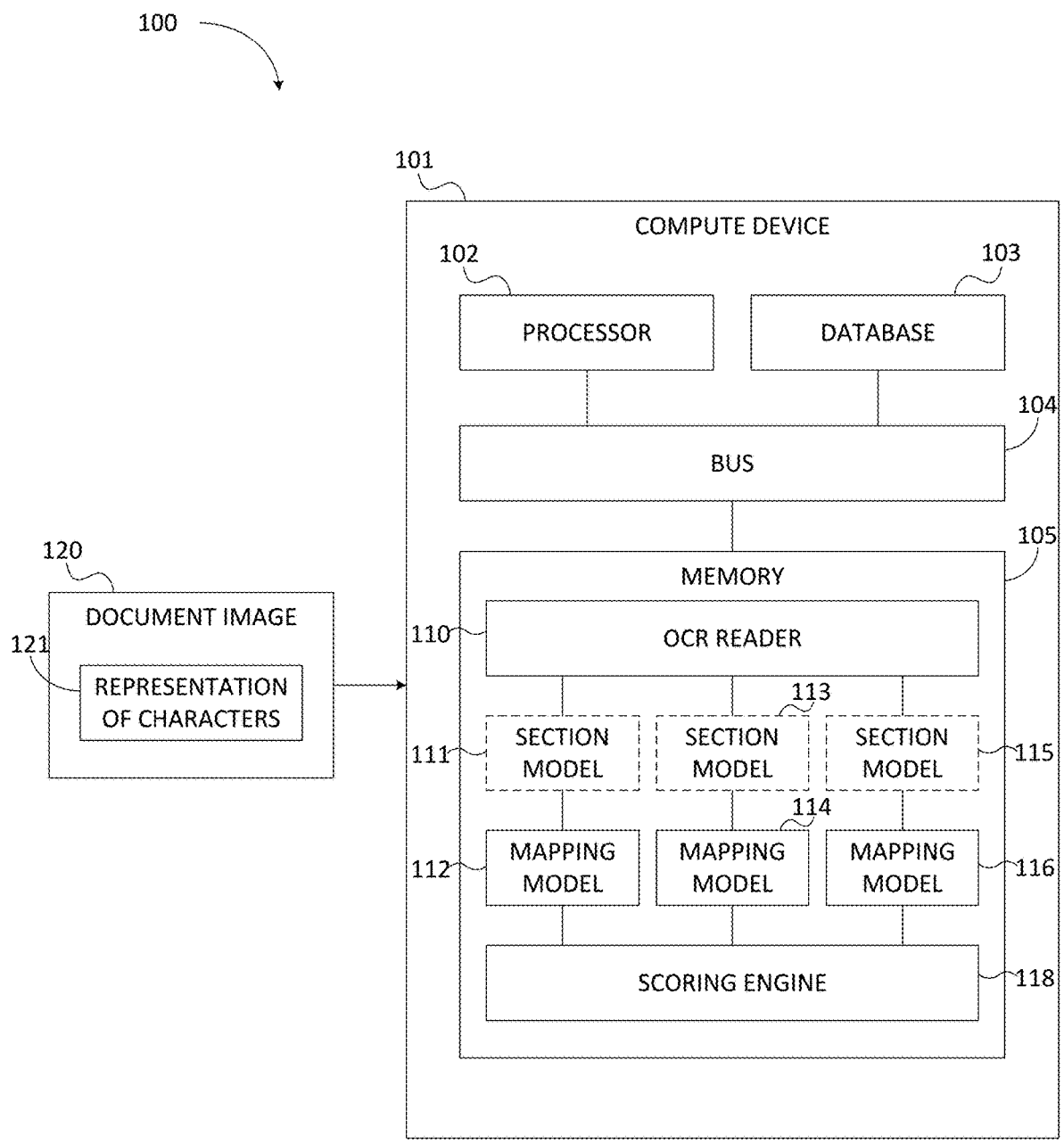
FIG. 1 is a block diagram of a system for encoding a document image with textual and visual features and then using machine learning to extract relevant data points, according to an embodiment.

In some embodiments, an apparatus can receive a set of document images such as, for example, images of resumes. The document images can be or include scanned copies, images, PDF files, JPEG files, PNG files, and/or the like. In some implementations, a document image can be or include an image of a resume document of a job candidate. It is to be understood that the document image is not limited to a resume and can be or include any image containing text, symbols, and/or the like such as job descriptions, health care records, doctors notes, contract, academic papers, books, poems, encyclopedia entries, financial documents, etc. The resume document can include various information about the job candidate seeking employment such as, for example, education, employment history, work experience, contact information, skills, projects, awards, certifications, hobbies, and/or the like. In some implementations, the document image can include a scanned copy or image of any document that includes text, images, symbols, and/or the like. The document image can include multiple representations of characters such as, for example, text, words, phrases, numbers, punctuation, dates, and/or the like. The scanned copy of the document image of a resume can include text that is comprehensible by a human (e.g., glyphs), but are not yet machine readable. Similarly stated, glyphs representing characters (e.g., letters) can be stored as visual information, rather than in a format or encoding in which individual characters are machine recognizable. The apparatus can use an OCR reader (e.g., hardware and or software stored in memory and/or executed by a processor) to parse the set of document images to extract multiple subsets of characters from multiple representations of characters (e.g., glyphs) present in the document image. In some cases, the OCR reader can include, for example Amazon Textract®, Google Tesseract®, and/or any other suitable model or transformer-based solution.

In some cases, the subsets of characters can be or include combinations of characters (e.g., letters, numbers, punctuation, etc.) forming words (recognized by a dictionary), dates, time, phrases, sentences, and/or the like. In some implementations, the apparatus can extract each subset of characters from the multiple subsets of characters based on a structure type from a set of predefined structure types. A structure type can describe and/or classify a subset of characters. For instance, the structure type for a combination of characters forming a single word can be "word." The structure type for a combination of words of significance (e.g., indicative of a header or title) forming "Work Experience" from the document image can be "section title." The structure type for a combination of words preceded by bullet, number, and/or any character indicative of list entries can be "bullet entry." In some implementations, the apparatus can recognize logical or semantic groupings of characters and/or subsets of characters from a document image to generate a text encoding. The text encoding can include a translation of the characters in the document image such that the translation is a machine-readable format, such as, for example, ASCII, Unicode, or any other suitable format In some implementations, apparatus can also translate subsets of characters to determine if more than one subset of characters form a recognizable phrase or term to generate a bounding box over those subsets of characters after identifying those subsets of characters.

In some cases, the apparatus can be configured to generate bounding boxes as an overlay over the document image to highlight the subsets of characters based on the predefined structure types. In some cases, the apparatus can be configured to translate, for a document image, the subsets of characters and generate, categorize, and/or tag them with bounding boxes. For instance, the apparatus can store (and update) a dictionary and use the dictionary to scan thousands of document images, and for each document image, tag subsets of characters to words defined in the dictionary. The dictionary can also store information deciphering numbers as dates, unique code, area codes of an address, time, and/or the like. In some cases, the apparatus can further compare thousands of tagged words, in combination with extracted numbers, to determine if a group of those tagged words and/or numbers form a different logical and/or semantic text to be grouped and/or associated with a larger bounding box. In some implementations, the apparatus can also use the OCR reader to generate bounding boxes over subsets of characters that resemble words, dates, times, and/or the like. In some cases, the apparatus can calculate dimensions of subsets of characters with respects to other characters in the document image and highlight those subsets of characters via a bounding box such that each bounding box does not overlap with each other. In some cases, the bounding box can be or include an area of a document image and or at least a portion of a document image outlining subsets of characters.

In some implementations, the apparatus can estimate a size and/or placement of a bounding box over a representation of a word. Once the bounding box is estimated and/or generated, the apparatus can perform character recognition of the representation to extract a machine-readable word. In some cases, the apparatus can also adjust the size and/or placement of the bounding box. For instance, if there are overlapping letters that were excluded from the bounding box, protrusions of letters inside the bounding box that extend outside of the bounding box, and/or the apparatus recognizes that the letters inside the bounding box do not form a complete word, the apparatus can adjust the dimensions, size and/or placement of the bounding box accordingly. In some cases, the apparatus can detect a portion of white space in the bounding box and reduce the dimensions and/or size of the bounding box to exclude the whitespace, without compromising the words already in the bounding box.

The apparatus can store bounding boxes of subsets of characters resembling words, dates, times, titles, phrases, sentences, and/or the like in memory (or a database) and scan each bounding box to determine groups of bounding boxes that form phrases, sentences, paragraphs, and/or the like. In some cases, the apparatus can be configured to then translate, for a document image, the subsets of characters surrounded by bounding boxes and generate a text encoding. The text encoding can include a translation of the characters in the document image such that the translation is a machine-readable format, such as, for example, ASCII, Unicode, or any other suitable format. For instance, the apparatus can recognize logical or semantic groupings of characters within each bounding box (or a group of bounding boxes) to generate the text encoding.

In some implementations, the OCR reader can identify glyphs in the document image and generate bounding boxes over the glyphs. In some cases, glyphs can also be referred to as representations of characters that are not machine readable and/or recognizable. In some cases, the OCR reader can predict which combination of glyphs belong to a single word, phrase, date, time, sentence, and/or the like. The OCR reader can translate visual representations of glyphs (e.g., characters) in bounding boxes into a machine-readable format. For instance, the apparatus can determine that a sequence of characters form a word, date, time, and/or the like. The apparatus can further determine that a sequence of words, dates, times, etc., form additional phrases, sentences, addresses, and/or the like. For example, the apparatus can extract characters forming a number, "2002." 2002 can appear, at first, a calendar year. The apparatus can further extract characters adjacent to that number which forms "2002 Front Range Way Fort Collins." The apparatus can deduce that those combination of characters more accurately form an address of a residence instead of a calendar year. The apparatus can further be caused to scan adjacent characters to determine the state (or province/region) and/or area code of that address as most addresses typically include an abbreviation of the state of and area code. In another instance, the apparatus can determine that a sequence of characters following a list identifier (e.g., a bullet, a number, a hyphen, etc.) is a set of words forming a list entry (e.g., a sentence, expression, phrase, etc.). In some cases, the apparatus can define bounding boxes after determining, based on logical and/or semantic groupings, for individual words, phrases, abbreviations, dates, times, addresses, sentences, and/or the like.

In some implementations, the apparatus can initially define bounding boxes over words and determine, based on logical and/or semantic groupings of bounding boxes, longer phrases and sentences in the document image. In addition or alternatively, the apparatus can determine that groups of characters separated by punctuation identifiers (e.g., commas, semicolons, hyphens, slashes, periods, etc.) represent phrases and/or sentences. In some instances, each character (or subset of characters) can be uniquely associated with one bounding box. Similarly stated, in some cases, bounding boxes are not overlapping or nested. In other instances, however, a bounding box representing, for example, a word may be contained within a larger bounding box representing, for example, a sentence. Similarly, in some instances bounding boxes can overlap or be nested. In the example of resume documents, bounding boxes can be defined to describe list entries. For instance, in a resume, one or more lines can describe each education experience, one or more lines can describe each work experience, and/or the like. In some cases, the apparatus can further generate bounding boxes for subsets of characters forming words and/or dates such as, for example, full name, job titles, job entities, resume section titles, dates of employment, and/or the like. The apparatus can further generate bounding boxes for words determined to be entries of a listing separated by commas such as, for example, skills, languages, responsibilities, awards, and/or the like.

In some implementations, the apparatus can extract and/or calculate visual features from the subset(s) of characters in each bounding box and in each document image generate a visual encoding for that document image. The visual encoding can be or include translations of visual information into machine-readable information such as, for example, text and/or values. For instance, a visual encoding of a parsed document can include a set of visual feature mappings that include visual features that describe visual information extracted in the parsed document. A visual feature can be or include structured and/or labeled visual features extracted from a parsed document and incorporated into a visual encoding. In some cases, the visual feature can be a feature vector describing visual information from the document image. For instance, each visual feature mapping from the set of visual feature mappings can include mappings of predefined visual feature types to visual features. In some cases, the visual features can include data in the form of text and/or value describing, for example, text alignment (e.g., left, right, centered, justified, etc.), line spacing, character spacing, location (e.g., pixel coordinates) of text on the document image, and/or the like, for the subsets of characters and/or subsets of characters in bounding boxes. The visual features can also describe whitespace, amount of pixels from all sides of margins of a document image, dimension of characters (or subset of characters), dimension of bounding boxes, and/or the like. The visual features can also describe stylistic information about characters such as, for example, boldness, italics, underlines, font, font size, and/or the like. In some cases, the visual features can be represented as plaintext. For example, the visual feature mapping for line spacing can include a visual feature type, from a set of predefined visual feature types, for line spacing mapped to a visual feature of double spacing. The visual feature mapping for a detected font can include a visual feature type for a font type mapped to a visual feature of Times New Roman. In some cases, the apparatus can pre-define visual feature types, scan each document image from thousands of document images to extract visual information from each parsed document, and tag the extracted visual information as a visual feature to an appropriate predefined visual feature type, to generate the visual feature mapping of the visual encoding for that parsed document. In other words, the visual encoding can be or include translations of visual information, which include extracted visual information, in a machine-readable and semantically comprehensible format.

In some implementations, the apparatus can determine visual features such as, for example, font names of text (e.g., Arial Regular, Calibri Light, Times New Roman, etc.). In some cases, the apparatus can cluster different words (via DBSCAN, k-means clustering, etc.) and/or lines of words together to train a model to calculate visual features. In some implementations, the apparatus can calculate non-textual features such as, for example, text color, underlines, highlights, whitespaces, background colors, and/or the like. In some implementations, the apparatus can correct words and/or phrases extracted from the OCR reader. For example, the apparatus can generate a parsed document that includes a machine-readable text such as "W O R K H I S T O R Y." The apparatus can correct a mistake on that machine-readable text to "WORK HISTORY." In some implementations, the apparatus can generating a set of parsed documents, each parsed document from the set of parsed documents uniquely associated with a document image from the set of document images and being based on the text encoding and the visual encoding for that document image.

In some implementations, the apparatus can scan parsed documents and identify sections for each parsed document. In some cases, the apparatus can also determine which portions and/or dimensional portions of the parsed document are uniquely associated with a section type from a set of predefined section types. A section type can include, for example, a section header, section title, and/or the like. For instance, a resume can include several section titles, each section title including information describing a job candidate based on that section title. For example, the apparatus can derive section titles such as, for example, contact information, work experience, education, skills, work history, languages, certification/awards, projects, and/or the like, by scanning the parsed document to identify information descriptive of each section title. In some cases, the apparatus can also derive other (e.g., less common) section titles such as, for example, career summary, hobbies, references, publications, and/or the like. It is to be understood that not every section type is present in a parsed document of a resume and that not every parsed document of a resume includes every section type. In some implementations, the apparatus can use visual features from the visual encoding to determine which subsets of characters (or bounding boxes) belong in a category specified by a section type. For instance, the visual encoding can indicate an identification of a first section title and multiple lines of sentences below the first section title before a reaching a second section title. In another instance, the visual encoding can indicate that a word in a larger font and in bold is indicative of a job title. The apparatus can scan each line and determine that those lines of sentences are between the first section title and the second section title are associated with the first section title and a section type uniquely associated with the first section title. In some implementations, the apparatus can derive sections based on section types from a parsed document by determining a similarity of the sequence of characters using multiple hard-coded variations of section titles and/or a pre-trained machine learning to output feature vectors for sequences of words.

In some implementations, the apparatus can train a set of machine learning models using derived sections and portions of the text encoding and the visual encoding for the derived sections. For instance, each machine learning model from the set of machine learning models can be associated (optionally uniquely) with a section type from a set of predefined section types (e.g., contact information, work experience, education, skills, work history, languages, certification/awards, projects, career summary, hobbies, references, publications, etc.). Each machine learning model can be trained using training data of sections including at least a portion of a parsed document including at least a portion of a text encoding and a visual encoding from that portion of the parsed document associated with one section and/or section type. In some cases, each machine learning model can be trained using open-source training data that include organization names, position titles, and/or other resume-related data. In some implementations, each machine learning model can be or include, for example, a neural network, a deep learning model, a supervised machine learning model, an unsupervised machine learning model, natural language classifier, and/or the like. In some implementations each machine learning model can include an autoregressive language model such as, for example, a Generative Pre-trained Transformer 3 (GPT-3), to produce human-like text.

In some implementations, each machine learning model can be trained to produce a trained machine learning model that output a section map uniquely associated with one section type. Each section map generated by each trained machine learning model can be configured to identify and/or extract information from at least a portion of a text encoding and at least a portion of a visual encoding associated with a predefine section type. The extracted information can be encoded as a section feature to be mapped to a predefined feature type from a set of predefined feature types. Each generated section map can be used in generating a structured data file. A section map can include a set of section feature mappings where each section feature mapping from the set of section feature mappings includes a section feature mapped to a predefined section feature. For instance, under a section map for a section title, "Contact information," the section map can include a section feature mappings with predefined feature type such as, for example. "full name" mapped to a section feature of "Jane Smith." In some implementations, predefined section feature types can include, for example, first name, last name, full name, email address, phone number, and/or the like. In other words, the section map can be a translation and/or structured information of a section from at least a portion of the text encoding and at least a portion of the visual encoding associated with that section. In some implementations, the training sets can be manually labeled and used to further train the machine learning models. In some cases, the section map can include incorrect section features mappings, which can be manually corrected and used as training sets.

In some implementations, each machine learning model can be trained using training sets that include at least a portion of a visual encoding and at least a portion of a text encoding from a section of a parsed document to accurately interpret and/or extract data from that section. For instance, in a section titled "Work Experience," the section can include a word such as "AWS" intended to describe place of work. The section can also include words such as "AWS engineer" intended to describe job title. AWS can stand for Amazon Web Service®. In some cases, AWS can also be a certification or a type of engineer (e.g., an engineer that uses AWS). A machine learning model associated with the section titled "Work Experience" can be trained to recognize that the word "AWS" opposed to "AWS engineer" is the place of work and that "AWS engineer" is the job title. In some cases, a job candidate can be employed at a different company than AWS such as, for example, Capital One R.

The job candidate can have a job title of AWS engineer at Capital One®. The machine learning model associated with that section can recognize that the place of work of the job candidate is Capital One® while the job position of the job candidate is AWS engineer without confusion.

In some implementations, the apparatus can generate scores for generated section maps and/or each section feature mapping in each section map. Higher scores can depict that the section feature mappings are more accurate while lower scores can depict that the feature mappings are less accurate. The apparatus can remove section feature mappings that are too low and/or below a score threshold. In some implementations, the apparatus can mark section feature mappings that are too low such that a human can correct the mistake.

FIG. 1 is a block diagram of a system 100 for encoding a document image 120 with textual and visual features and then using machine learning to extract relevant data points, according to an embodiment. The system 100 can include a compute device 101 configured to receive a document image 120 and/or multiple document images. The document image 120 can be or a scanned copy, image, PDF file, JPEG file, PNG file, and/or the like. The document image 120 can include a set of representations of characters 121 such as, for example, text, words, phrases, numbers, dates, punctuations, and/or the like. In some implementations, the document image 120 can be or include an image of a resume of a job candidate. The resume can include information describing work experience, contact information, work history, education, and/or the like, of that job candidate.

The compute device 101 includes a processor 102, a database 103, and a memory 105 that communicate with each other, and with other components, via a bus 104. The database 103 can be or include a data storage system that stores data received and/or generated by the processor 102 of the compute device 101. For example, the database 103 can be configured to store multiple resumes, training sets, and/or the like. Alternatively or additionally, the system 100 can include a cloud database (not shown in FIG. 1) that the compute device 101 can access via a connection to a network (not shown in FIG. 1). The bus 104 can include any of several types of bus structures including, but not limited to, a memory bus, a memory controller, a peripheral bus, a local bus, and any combinations thereof, using any of a variety of bus architectures. The compute device 101 can be or include, for example, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. The compute device 101 can also include multiple compute devices that can be used to implement a specially configured set of instructions for causing one or more of the compute devices to perform any one or more of the aspects and/or methodologies described herein.

The compute device 101 can include a network interface (not shown in FIG. 1). A network interface device, such as the network interface, can be utilized for connecting the compute device 101 to one or more of a variety of networks and one or more remote devices connected thereto. In other words, although not shown in FIG. 1, the various devices including computer device 101 can communicate with other devices via a network(s). Examples of a network include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth®; network, a virtual network, and/or any combination thereof. In some instances, the network can be a wireless network such as, for example, a Wi-Fi or wireless local area network ("WLAN"), a wireless wide area network ("WWAN"), and/or a cellular network. In other instances, the network can be a wired network such as, for example, an Ethernet network, a digital subscription line ("DSL") network, a broadband network, and/or a fiber-optic network. In some instances, the compute device 101 can use Application Programming Interfaces (APIs) and/or data interchange formats (e.g., Representational State Transfer (REST), JavaScript Object Notation (JSON). Extensible Markup Language (XML), Simple Object Access Protocol (SOAP), and/or Java Message Service (JMS)). The communications sent via the network can be encrypted or unencrypted. In some instances, the network can include multiple networks or subnetworks operatively coupled to one another by, for example, network bridges, routers, switches, gateways and/or the like.

The processor 102 can be or include, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 102 can be configured to run any of the methods and/or portions of methods discussed herein.

The memory 105 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 102 to perform one or more processes, functions, and/or the like. In some implementations, the memory 105 can include extendable storage units that can be added and used incrementally. In some implementations, the memory 105 can be a portable memory (e.g., a flash drive, a portable hard disk, and/or the like) that can be operatively coupled to the processor 102. The memory 105 can include various components (e.g., machine-readable media) including, but not limited to, a random-access memory component, a read only component, and any combinations thereof. In one example, a basic input/output system (BIOS), including basic routines that help to transfer information between components within the compute system 101, such as during start-up, can be stored in memory 105. The memory 105 can further include any number of program modules including, for example, an operating system, one or more application programs, other program modules, program data, and any combinations thereof.

The memory 105 can include, for example, an OCR reader 110, a set of mapping machine learning models (e.g., mapping machine learning model 112, 114, 116) and/or a confidence scoring engine 118. The OCR reader 110 can be or include a software component configured to convert scanned images of text such as, for example, the document image 120 into machine-readable text. For example, the OCR reader 110 can include Abbyy FineReader®, Google Cloud Vision®, OCRFeeder®, Amazon Textract®, Google Tesseract®, SimpleOCR®, i20CR®, and/or the like. In some cases, the memory 105 can optionally include a set of section machine learning models (e.g., section machine learning model 111, 113, 115). Each machine learning model (also referred to herein as a "machine learning model") from the set of mapping machine learning models and the set of section machine learning models can include a set of model parameters such as weights, biases, or activation functions that can be executed to annotate and/or classify text (e.g., the set of representations of characters 121) of the document image 120 or a set of document images. The machine learning model can be executed during a training phase and/or an execution phase.

The machine learning model can be or include at least one of a supervised machine learning model, an unsupervised machine learning model, a tree-based model, a deep neural network model (DNN), an artificial neural network (ANN) model, a fully connected neural network, a convolutional neural network (CNN), a residual network model, a region proposal network (RPN) model, a feature pyramid network (FPN) model, a generative adversarial network (GAN), a K-Nearest Neighbors (KNN) model, a Support Vector Machine (SVM), a decision tree, a random forest, an analysis of variation (ANOVA), boosting, a Naïve Bayes classifier, and/or the like.

In some implementations, the memory 105 can store instructions to cause the processor 102 to receive the document image 120 and/or the set of document images. In some instances, the document image 120 can be scanned copy of a resume of a job candidate. The resume can include information describing the job candidate seeking employment such as, for example, education, contact information, work experience, skills, and/or the like. In some implementations, the document image 120 can be received by the processor such that the information in the document image 120 is not machine readable. For instance, text in the document image 120 can be received by the processor 102 such that the document image 120 includes representations of characters (e.g., glyphs). In some implementations, the processor 102 can receive the document image 120 from a remote compute device (not shown in FIG. 1) connected via the network. The memory 105 can store instructions to cause the processor 102 to parse the document image 120 (or the set of document images) via the OCR reader 110 to extract a subsets of characters (e.g., text, words, phrases, numbers, dates, punctuations, etc.) from the set of representations of characters 121 in the document image 120 based on a structure type from a set of structure types and to generate a text encoding for the document image 120 based on the subsets of characters. In some implementations, the text encoding can be or include a conversion of the document image 120 into digital data that contains and/or represents text. In some implementations, the OCR reader 110 can translate the subsets of characters extracted from the document image 120 into text and/or some format that is machine-readable to generate the text encoding. For instance, the OCR reader 110 can extract textual information of a resume found in the document image 120. In some implementations, the text encoding can be or include a translation of the set of representation of characters 121 such that the translation is in a machine-readable format, such as, for example, ASCII, Unicode, or any other suitable format.

In some cases, the subsets of characters can be or include combinations of characters (e.g., letters, numbers, punctuation, etc.) forming words (recognized by a dictionary), dates, time, phrases, sentences, and/or the like. In some implementations, the processor 102 can be caused to extract, via the OCR reader 110, each subset of characters from the subsets of characters based on a structure type. A structure type can describe and/or classify a subset of characters. For instance, the structure type for a combination of characters forming a single word can be "word." The structure type for a combination of words of significance (i.e., indicative of a header or title) forming "Work Experience" from the document image can be "section title." The structure type for a combination of words preceded by bullet, number, and/or any character indicative of list entries can be "bullet entry." In some implementations, the processor 102 can recognize, via the OCR reader 110, logical and/or semantic groupings of characters and/or subsets of characters from the document image 120 to generate the text encoding.

In some implementations, processor 102 can also translate and/or process subsets of characters (using a hard-coded dictionary) to determine if more than one subset of characters form a recognizable phrase or term. For instance, the processor can store (and update) a dictionary in the database 103 and use the dictionary to scan thousands of document images, and for each document image, tag subsets of characters to words defined in the dictionary. The dictionary can also store information deciphering numbers as dates, unique code, area codes of an address, time, and/or the like. In some cases, the processor 102 can further compare thousands of tagged words, in combination with extracted numbers, to determine if a group of those tagged words and/or numbers form a different and/or more coherent logical and/or semantic text.

In some implementations, the memory 105 can store instructions to cause the processor 102 to highlight and/or outline each subset of character from the set of subset of characters. In some implementations, the processor 102 can be caused to generate a bounding box over at least some subsets of characters extracted from the document image 120. In some cases, each bounding box can be generated and/or associated with a subset of characters based on a structure type of that subset of characters. A bounding box can be or include an area of the document image 120 and or at least a portion of the document image 120 outlining a subset and/or subsets of characters. In some implementations, the bounding box can be or include a representation of a boundary that is overlayed on the document image 120. In some cases, the bounding box can be a dimensional outline and/or box that highlights words, dates, phrases, and/or the like. In some implementations, a structure type can describe a subset of characters for each bounding box. For instance, the structure type for a bounding box over a single word can be "word." The structure type for a bounding box over "Work Experience" from the document image can be "section title." The structure type for a bounding box over a bulleted list entry describing job duties/responsibilities can be "bullet entry." In some implementations, the processor 102 can also translate text encodings of the subset(s) of characters in each bounding box into comprehensive, machine-readable, and/or cohesive text.

In some implementations, each bounding box from the set of bounding boxes can be uniquely associated with a subset of characters from the subsets of characters. For instance, the processor 102 can determine that a sequence of subsets of characters following a list identifier (e.g., a bullet, a number, a hyphen, etc.) is a set of words forming a list entry (e.g., a sentence, expression, phrase, etc.). The processor 102 can also determine subsets of characters forming list entries separated by punctuation identifiers. (e.g., commas, semicolons, hyphens, slashes, periods, etc.). In some implementations, the processor 102 can also determine complete words, dates, abbreviations, combination of words and numbers, and/or the like. The processor 102 can generate bounding boxes over single words, multiple words forming a complete sentence/phrase, dates, email address, phone number, and/or the like. In some cases, the processor 102 can generate bounding boxes over a section title of the resume in the document (e.g., "Contact Information," "Work Experience," "Education," etc.) and/or an entire bulleted list entry.

In some implementations, the processor 102 can detect a structure type for subset and/or subsets of characters based on a number of characters from subset and/or subsets of characters that are adjacent and/or consecutive. For instance, adjacent characters in between two white spaces can indicate a word for the characters in between the two white spaces. In another instance, adjacent characters with a hyphen in between them can indicate a two-word phrase. In some cases, the processor 102 can be caused to detect for specific key words of importance indicative of section titles and/or headers (e.g., "education," "work experience," "contact information," "skills," "awards," etc.). In some cases, the processor 102 can first generate a bounding box over a subset of words and associate that bounding box with a structure type based on a size and/or dimension of the bounding box (or set of bounding boxes). For instance, a word in the document image 120 can have a font size significantly larger than most other words, resulting in the processor 102 generating a larger bounding box. The processor 102 can detect that a dimension and/or size of the larger bounding box is also larger than dimensions and/or sizes of bounding boxes associated with most other words. The processor 102 can determine that the larger bounding box includes a subset of characters (or subsets of characters) to be a structure type of section title.

In some implementations, the processor 102 can be caused to extract and/or calculate visual features associated with the characters in each bounding box to generate a visual encoding for that document image. The visual encoding can be or include translations of visual information into machine-readable information such as, for example, text and/or values. For instance, a visual encoding of a document image can include a set of visual features that describe visual information extracted in the document image. A visual feature can be or include structured and/or labeled visual information extracted from document image and incorporated into a visual feature mapping of a visual encoding. For instance, a visual encoding can include a set of visual feature mappings where each visual feature mapping from the set of visual feature mappings can include a visual feature types from a set of predefined visual feature types mapped to a visual feature from a set of visual features. In some cases, the visual features can include data in the form of text and/or value describing, for example, text alignment (e.g., left, right, centered, justified, etc.), line spacing, character spacing, location (e.g., pixel coordinates) of text on the document image, and/or the like, for the subsets of characters and/or subsets of characters in bounding boxes. The visual features can also describe whitespace, amount of pixels from all sides of margins of a document image, dimension of characters (or subset of characters), dimension of bounding boxes, and/or the like. The visual features can also describe stylistic information about characters such as, for example, boldness, italics, underlines, font, font size, and/or the like. For example, a visual encoding can include a visual feature mapping for line spacing that can include a visual feature type for line spacing mapped to a visual feature of double spacing. In another example, a visual encoding can include a visual feature mapping for a detected font that can include a visual feature type for a font mapped to a visual feature of Times New Roman. In some cases, the processor 102 can pre-define the visual feature types, scan each document image to extract visual information, encode the visual information to a visual feature, and tag the visual feature to an appropriate visual feature type, to generate a visual feature mapping. Multiple visual feature mappings can form the visual encoding of that document image. In other words, the visual encoding can be or include translations of visual information, which include encoded visual features, in a machine-readable and semantically comprehensible format.

The visual encoding can include a machine-readable translation of character sequences unlikely to appear in natural language, such as "[*" and "*]" such that visual encodings are not mistaken for textual information when subjected to further processing or analysis as described in further detail herein. For example, the visual encoding can include a machine-readable translation of double spacing of lines as "[*2.0*]". In another example, a visual feature mapping of a visual encoding can include a machine-readable translation of a detected font such as "[font='Times New Roman']". In another example, a visual feature mapping of a visual encoding can include a machine-readable translation for bolded text to include an opening tag [b] and a closing tag [/b]. In another example, a visual feature mapping of a visual encoding can include a machine-readable translation for a color of text such as "[color='black']".

In some implementations, the memory 105 can store instructions to further cause the processor 102 to generate a set of parsed documents, each parsed document from the set of parsed documents uniquely associated with a document image (e.g., document image 120) from the set of document images and being based on the text encoding and the visual encoding for that document image. In other words, the parsed document can include a version of the document image such that the parsed document includes textual information and visual information extracted from the document image 120.

In some implementations, the memory 105 can store instructions to further cause the processor 102 to identify, for each parsed document, identify a set of sections, each section from the set of sections uniquely associated with a section type from a predefined set of section types. In some implementations, the section type can be, for example, a section in a resume that contains information about specific information about the job candidate. Examples of predefined section types include: work experience, education, awards, certifications, work history, references, career summary, contact information, hobbies, skills, headshot, and/or the like. In some implementations, the processor 102 can be caused to update the predefined set of section types with new section types. In some cases, a single section machine learning model can be trained to determine which section types are present in each parsed document. In other cases multiple section machine learning models can be trained to identify various section types, such as, for example, training one machine learning model to identify one section type and applying the multiple machine learning models (in series or parallel) to parsed documents to identify various sections.

As one example, the processor 102 can identify specific portions and/or spaces in the parsed document that is generally associated with a section and/or section type via the set of section machine learning models (e.g., section machine learning model 111, 113, 115). For example, one section machine learning model can be trained to classify a portion of the parsed document to be associated with contact information based on a portion of the text encoding and a portion of the visual encoding of that portion of the parsed document. In some cases, a section machine learning model can be configured to receive inputs to focus (or fixed) on a scanning a particular portion and/or location (typically containing information about a specific section type) of the parsed document to determine if that particular portion and/or location of the parsed document is associated with the section type associated with that section machine learning model. Such an implementation can reduce computational overhead in identifying multiple sections from multiple parsed documents compared to using a single machine learning model.

Each section machine learning model from the set of section machine learning models (e.g., section machine learning model 111, 113, 115) can be associated with scanning some or all of the parsed document to determine which sections (or section types) are present in the parsed document and/or which portions of the parsed document are associated with a specific section type. In some implementations, the set of section machine learning models (e.g., section machine learning model 111, 113, 115) can be executed by the processor 102 to segment the parsed document to generate segmented portions of the parsed document to be used as inputs for the set of mapping machine learning models (e.g., mapping machine learning model 112, 114, 116). Each section map can be designated by one mapping machine learning model from a set of mapping machine learning models (e.g., mapping machine learning model 112, 114, 116). An mapping machine learning model can be or include any machine learning and/or neural network configured to be trained to extract, translate and/or map one or more features from at least a portion of a text encoding and at least a portion of a visual encoding from one section of the parsed document to which it is applied. A section map can be or include a set of section feature mappings that map information extracted from at least a portion of a text encoding and at least a portion of a visual encoding from a portion of a parsed document where the portion of the parsed document is associated with a section type of that section map. In some implementations, the set of section machine learning models (e.g., section machine learning model 111, 113, 115) can be trained to produce a set of trained section machine learning models (not shown in FIG. 1) using training data that contains multiple different parsed documents of resumes to accurately predict sections and section types in a parsed document.

In some implementations, the memory 105 can store instructions to further cause the processor 102 to train the set of mapping machine learning models (e.g., mapping machine learning model 112, 114, 116), to produce a set of trained mapping machine learning models (not shown in FIG. 1). Each mapping machine learning model from the set of mapping machine learning models can be uniquely associated with one section type (e.g., contact information, education, work experience, etc.) from the set of section types. For example, the mapping machine learning model 112 can be associated with education and trained to extract information from an education section in the parsed document. In another example, the mapping machine learning model 114 can be associated with contact information and trained to extract information from a contact information section in the parsed document. In another example, the mapping machine learning model 116 can be associated with work experience and trained to extract information from a work experience section in the parsed document. Each mapping machine learning model can be trained using at least a portion of the visual encoding and at least a portion of the text encoding found in the section associated with that mapping machine learning model. For instance, the mapping machine learning model 112 associated with education can be trained with the at least a portion of the text encoding of the education section (that was identified by the encoding model 111 associated with identifying the education section) and the at least a portion of the visual encoding of the education section. In some implementations, the set of mapping machine learning models (e.g., mapping machine learning models 112, 114, 116) can be trained using the at least a portion of the text encoding and the at least a portion of the visual encoding from the identification of sections from the set of trained section machine learning models.

In some implementations, the memory 105 can store instructions to further cause the processor 102 to execute the set of trained mapping machine learning models. Each trained mapping machine learning model can be uniquely associated with a section type. A trained mapping machine learning model can be or include any trained machine learning and/or neural network configured to Each mapping machine learning model can extract and/or encode one or more section features from one section of the parsed document to which it is applied. Each section feature from a set of section features can be associated with a section feature type from a set of predefined section feature types. For instance, a section feature type can be or include a category of features and/or data extracted from the parsed document, such as, for example, first name, last name, institution of education, degree, skills, company name, job title, and/or the like. Section features can be, for example, extracted data associated with the predefined feature types. For instance, the parsed document can include a job title of "business analyst" which would correlate (or labeled) to a feature type of job title. In some implementations, the memory 105 can store instructions to further cause the processor 102 to map the extracted features to the predefined feature types to produce a set of feature mappings.

In some implementations, the memory 105 can include instructions to further cause the processor 102 to execute each machine learning model to generate a section map for the section type to which that machine learning model is uniquely associated. The section map can be or include a set of section feature mappings where each section feature mapping from the set of section feature mappings includes section features encoded from section information from that section of the parsed document and mapped to a section feature type from a set of predefined section feature types. A section map can be associated with one section type from the set of predefined section types. A section feature type can be or include an encoded label from a section type from a set of predefined section types. A section feature can be or include an encoded information for a correlated section feature type. For example, predefined section feature types associated with a contact information section can include "first name," "last name," "full name," "email," "phone number," "Linkedin®," and/or the like. In some implementations, the section map associated with that contact information section can include section feature mappings of predefined section feature types to section features such as, for example, "'first name': 'John'", "'last name': 'Smith'", "'full name: 'John Smith'", "'email': 'johnsmith@gmail.com'", and/or the like. The structured data file can include section maps where each section map includes a set of section feature mappings. In some implementations, an mapping machine learning model associated with an education section can be configured to extract section features from the education section of the parsed document and generate the section map for the education section. In some cases, the section map for the education section can include section feature mappings such as, for example, a college name mapped to the college attended by a job candidate of the parsed document.

In some implementations, each mapping machine learning model can be configured to identify a (predefined) subset of feature types. For example, an mapping machine learning model uniquely associated with an "education" section type can be configured to identify features associated with schools attended, but not features associated with workplaces. In other implementations, each mapping machine learning model can be configured to identify any and/or all feature types. In such an implementation in which mapping machine learning models are configured to identify any and/or all feature types, the processor 102 can be caused to consolidate features identified by different mapping machine learning models. For example, when different mapping machine learning models return different features for the same feature type (e.g., different "home address(es)") the processor can be operable to identify the most probably feature, for example, based on confidence score, encoding model, and/or the like.

In some implementations, the memory 105 can store instructions to further cause the processor 102 to generate a structured data file and/or a set of structured data files based on at least a section feature from a set of section features extracted from the parsed document. In some cases, a structured data file can be or include a JSON file. The structured data file can include the set section maps where each section map includes a set section feature mappings generated by the set of mapping machine learning models (e.g., mapping machine learning model 112, 114, 116). In some cases, the structured data file can be or include a JSON file. In other words, the structured data file can include information extracted, identified, mapped, and/or translated from at least a portion of a text encoding and at least a portion of a visual encoding of each section from the parsed document via each section machine learning model. In some implementations, the structured data file can include the set of section maps with section feature mappings such that each section feature mapping from the set of section feature mappings includes a section feature type mapped to a section feature extracted from the parsed document. In some implementations, section feature types (e.g., categories) of the section feature mappings can be predefined such that the set of mapping machine learning models (e.g., mapping machine learning model 112, 114, 116) can map extracted information for those predefined section feature types (e.g., categories).

In some implementations, the set of mapping machine learning models (e.g., mapping machine learning model 112, 114, 116) can be trained using training sets that include portions of text encodings and portions of visual encodings from multiple parsed documents to accurately interpret and/or extract data from that each section in each parsed document. For instance, in a section from a parsed document titled "Work Experience," the section can include a word such as "AWS" intended to describe place of work. The section can also include words such as "AWS engineer" intended to describe job title. AWS can stand for Amazon Web Service®. In some cases, AWS can also be a certification or a type of engineer (e.g., an engineer that uses AWS). An mapping machine learning model associated with the section titled "Work Experience" can be trained to recognize that the word "AWS" opposed to "AWS engineer" is the place of work and that "AWS engineer" is the job title. In some cases, a job candidate can be employed at a different company than AWS such as, for example, Capital One®. The job candidate can have a job title of AWS engineer at Capital One®. Based on information from a portion of a text encoding and a portion of a visual encoding from the parsed document for the words of "Capital One®" and "AWS engineer" in the section, that mapping machine learning model associated with that section can recognize that the place of work of the job candidate is Capital One® while the job position of the job candidate is AWS engineer without confusion.

In some implementations, each machine learning model from the set of section machine learning models (e.g., section machine learning model 111, 113, 115) and the set of mapping machine learning models (e.g., mapping machine learning model 112, 114, 116) can be executed during a training phase and/or an execution phase. In the training phase for the set of section machine learning models, the set of section machine learning models can receive training data and continuously update a set of model parameters of the each section machine learning model. In some cases, the set of model parameters for the set of section machine learning models can be updated (or improved) such that portions of a document image in the training data can be annotated and/or classified correctly with a certain likelihood of correctness (e.g., a pre-set likelihood of correctness) to a section type. In some cases, the set of model parameters can be updated (or improved) such that a set of words of a document image in the training data can be annotated and/or classified correctly with a certain likelihood of correctness (e.g., a pre-set likelihood of correctness) to a section.

In the training phase for the set of mapping machine learning models, the set of mapping machine learning models can receive training data and update (or improves) a set of model parameters of the each mapping machine learning model. In some cases, the set of model parameters for the set of mapping machine learning models can be updated (or improved) such that encoded sections of a structured data file in the training data can be annotated and/or classified correctly with a certain likelihood of correctness (e.g., a pre-set likelihood of correctness) to an actual translation of characters from a document image. In some cases, the set of model parameters can be updated (or improved) such that section feature types in section maps of a structured data file in the training data can be annotated and/or classified correctly with a certain likelihood of correctness (e.g., a pre-set likelihood of correctness) to accurate section features.

In some implementations, the training data can include sets of document images of resumes received from the OCR reader 110, and a set of representations of annotations of information associated with specific section types. This is so, at least in part, to train a machine learning model(s) (e.g., set of section machine learning models and/or set of mapping machine learning models) how to identify, classify, and/or cluster information for various section types.

In some instances, the training data can be divided into a training set, a test set, and/or a validation set. For example, the training data can be randomly divided so that 60% of the training data is in the training set, 20% of the training data is in the test set, and 20% of the training data is in the validation set. Each machine learning model from the set of section machine learning models (e.g., section machine learning model 111, 113, 115) and the set of mapping machine learning models (e.g., mapping machine learning model 112, 114, 116) can be iteratively updated (or improved) based on the training set while being tested on the test set to avoid overfitting and/or underfitting of the training set. Once each machine learning model from the set of section machine learning models and the set of mapping machine learning models is trained based on the training set and the test set, a performance of each machine learning model can be further verified based on the validation set.

In the execution phase for the set of section machine learning models (or set of trained section machine learning models), each machine learning model from the set of section machine learning model can receive at least one document image (a document image(s) not among the set of document images used in the training phase) and can annotate and/or classify sections and/or bounding boxes of the at least one document image. Because the execution phase is performed using the set model parameters that were already updated during the training phase, the execution phase can be computationally efficiently.

In the execution phase for the set of mapping machine learning models (or set of trained mapping machine learning models), each machine learning model from the set of mapping machine learning model can receive at least one parsed document (a parsed document(s) not among the set of parsed documents used in the training phase) that includes extracted (or encoded) textual and visual information. Because the execution phase is performed using the set model parameters that were already optimized during the training phase, the execution phase can be computationally efficiently.

In some implementations, each section machine learning model and/or each mapping machine learning model can be caused to be trained and/or executed in parallel via the processor 102. This is so, at least in part, to classify information from document images and/or parsed documents computationally and more efficiently than conventional document parsing techniques.

In some implementations, the memory 105 can store instructions to cause the processor to generate, via the confidence scoring engine 118, a score for each section feature (or section feature mapping) and/or section map from the structured data and/or extracted from the parsed document. The confidence scoring engine 118 can be or include a software component configured to perform a specific set of calculations and/or algorithms to determine a score for a section feature. The score can be or include any numerical value of a numerical range and/or a symbol indicative of a rating/grade. The score can indicate a level of accuracy of an output of a trained encoded machine learning model is to a correct representation of text from the document image 120. For instance, the mapping machine learning model 112 can generate a section map with a section feature that includes a section feature type of "full name" mapped to a section feature of "John Smith." If the generated section feature of "John Smith" is accurate with respect to a full name as seen in the document image 120, that section feature can be assigned with a high score. In some implementations, the memory 105 can store instructions to further cause the processor 102 to remove a section feature from the section feature mapping based on the score for that section feature being below a score threshold. The score threshold can be an upper and/or lower limit for scores of section features. If a score does not satisfy or fall within the score threshold, the section feature associated with that score can be removed from the section feature mapping, manually and/or automatically. In some cases, section features with low scores can be manually and/or automatically corrected and used as training data to further enhance the mapping machine learning model associated with generating that section feature.

FIG. 2 is a schematic illustration of a document image 200 with bounding boxes surrounding characters, according to an embodiment. The document image 200 can be consistent with the document image 120 of FIG. 1. In some implementations, the document image 200 can include a resume of a job candidate. The resume can include information describing work experience, contact information, work history, education, and/or the like, of that job candidate. The document image 200 can be a scanned copy, image, PDF file, JPEG file, PNG file, and/or the like. In some implementations, the document image 200 can be or include a machine generated and/or annotated version of the document image containing identified subsets of characters. In some cases, the subsets of characters can be identified and outlined by bounding boxes.

In some implementations, a compute device (not shown in FIG. 2) can receive the document image 200 to parse the document image 200 via an OCR reader stored in a memory at the compute device. The compute device can identify the set of characters in the document image 200 via the OCR reader to produce a text encoding for the document image. The text encoding can include a translation of the set of characters in the document image 200 such that the translation is a machine-readable format, such as, for example, ASCII, Unicode, or any other suitable format. The text encoding can include combinations of characters forming words, dates, addresses, sentences, phrases, and/or the like.

In some implementations, the compute device can also generate a set of bounding boxes around subsets of characters based on the text encoding (or subsets of the document image) to produce the document image 200. In some cases, the OCR reader can also be used to generate the set of bounding boxes. The document image 200 can be parsed such that textual and visual information are extracted from the document image 200 and reproduced as a parsed document including a text encoding and a visual encoding. The document image 200 can include the set of bounding boxes over subsets of characters as shown in FIG. 2. For instance, based on the text encoding, the compute device can identify word(s) and generate a bounding box over the identified word(s). For example, the compute device can generate a bounding box 202 around a full name of the job candidate, a bounding box 203 over a place of residence of the job candidate, a bounding box 204 over an email address of the job candidate, and/or the like. In some cases, the compute device can generate bounding boxes around individual words.

In some implementations, the set of bounding boxes can be or include representations of a boundary that is overlayed and surrounding the text encoding and/or subset(s) of characters in the text encoding. Each bounding box from the set of bounding boxes can be uniquely associated with a subset (s) of characters. For instance, the compute device can determine that a sequence of characters following a list identifier (e.g., a bullet, a number, a hyphen, etc.) is a set of words forming a list entry (e.g., a sentence, expression, phrase, etc.). The compute device can also determine groups of characters forming list entries separated by punctuation identifiers. (e.g., commas, semicolons, hyphens, slashes, periods, etc.). In some implementations, the compute device can also determine complete words, dates, abbreviations, combination of words and numbers, and/or the like. The compute device can generate bounding boxes over single words, multiple words forming a complete sentence/phrase, dates, email address, phone number, and/or the like. In some cases, the compute device can generate bounding boxes over a section title of the resume in the parsed document (e.g., "Contact Information," "Work Experience," "Education," etc.) and/or an entire bulleted list entry.

In some implementations, the compute device can also generate each bounding box based on a structure type. The structure type can describe a subset(s) of characters for each bounding box. For instance, the structure type for a bounding box over a single word can be "word." The structure type for a bounding box over "Work Experience" from the document image 200 can be "section title." The structure type for a bounding box over a bulleted list entry describing job duties/responsibilities can be "bullet entry." In some implementations, the compute device can also translate text encodings of the subset(s) of characters in each bounding box into comprehensive, machine-readable, and/or cohesive text.

In some implementations, the compute device can extract and/or calculate visual features associated with the characters in each bounding box to generate a visual encoding for that document image. The visual encoding can be or include translations of visual information into machine-readable information such as, for example, text and/or values. For instance, a visual encoding of a document image can include a set of visual features that describe visual information extracted in the document image. A visual feature can be or include structured and/or labeled visual information extracted from document image and incorporated into a visual feature mapping of a visual encoding. For instance, a visual encoding can include a set of visual feature mappings where each visual feature mapping from the set of visual feature mappings can include a visual feature types from a set of predefined visual feature types mapped to a visual feature from a set of visual features. In some cases, the visual features can include data in the form of text and/or value describing, for example, text alignment (e.g., left, right, centered, justified, etc.), line spacing, character spacing, location (e.g., pixel coordinates) of text on the document image, and/or the like, for the subsets of characters and/or subsets of characters in bounding boxes. The visual features can also describe whitespace, amount of pixels from all sides of margins of a document image, dimension of characters (or subset of characters), dimension of bounding boxes, and/or the like. The visual features can also describe stylistic information about characters such as, for example, boldness, italics, underlines, font, font size, and/or the like. For example, a visual encoding can include a visual feature mapping for line spacing that can include a visual feature type for line spacing mapped to a visual feature of double spacing. In another example, a visual encoding can include a visual feature mapping for a detected font that can include a visual feature type for a font mapped to a visual feature of Times New Roman. In some cases, the processor 102 can pre-define the visual feature types, scan each document image to extract visual information, encode the visual information to a visual feature, and tag the visual feature to an appropriate visual feature type, to generate a visual feature mapping. Multiple visual feature mappings can form the visual encoding of that document image. In other words, the visual encoding can be or include translations of visual information, which include encoded visual features, in a machine-readable and semantically comprehensible format.

The visual encoding can include a machine-readable translation of character sequences unlikely to appear in natural language, such as "[*" and "*]" such that visual encodings are not mistaken for textual information when subjected to further processing or analysis as described in further detail herein. For example, the visual encoding can include a machine-readable translation of double spacing of lines as "[*2.0*]". In another example, a visual feature mapping of a visual encoding can include a machine-readable translation of a detected font such as "[font='Times New Roman']". In another example, a visual feature mapping of a visual encoding can include a machine-readable translation for bolded text to include an opening tag [b] and a closing tag [/b]. In another example, a visual feature mapping of a visual encoding can include a machine-readable translation for a color of text such as "[color='black']".

In some implementations, the compute device can generate a set of parsed documents, each parsed document from the set of parsed documents uniquely associated with a document image from the set of document images and being based on the text encoding and the visual encoding for that document image. In other words, the parsed document can include a version of the document image 200 such that the parsed document includes textual information and visual information extracted from the document image 200.

In some implementations, the compute device can be configured to identify a set of sections based on the text encoding and the visual encoding. Each section from the set of sections can be associated with a section type from a predefined set of section types. In some implementations, the section type can be, for example, a section in a resume that contains information about specific information about the job candidate. For instance, the section type can include work experience, education, awards, certifications, work history, references, career summary, contact information, hobbies, skills, headshot, and/or the like. In some implementations, the compute device can generate a bounding box for each section identified and overlayed on the document image 200 and/or parsed document. For instance, the compute device can generate a bounding box for a contact information section 201, a bounding box for a career summary section 211, a bounding box for a work experience section 221, a bounding box for a work history section 231, a bounding box for an education section 241, and/or the like. In some implementations, the compute device can determine, via a set of section machine learning models (or set of trained section machine learning models) to determine which portion of the document image 200 and/or parsed document is associated with which section.

In some implementations, the compute device can determine, based on previous document images of resumes and/or parsed documents, sections and/or section types from the parsed documents. In some cases, the compute device can receive an input to scan a particular location in the parsed document to determine and/or confirm existence of a specific section type. In some implementations, the compute device can determine, based on an input of text encoding and/or the subset(s) of characters in the set of bounding boxes, groups of words and their associated section types. For instance, the bounding box 202 for the full name, the bounding box 203 for the place of residence, and/or the bounding box 204 of the email address can indicate and/or satisfy certain requirements that those bounding boxes are associated with the contact information section 201.

In some implementations, the compute device can also determine key words (e.g., section titles) such as, for example, "career summary," "work experience," "education," "awards," and/or the like, to determine section type. In some cases, the compute device can use the visual encoding to identify sections. For instance, the compute device can determine a word or a set of words that are in bold and in larger font size, which can be indicative of being a section title.

In some implementations, the compute device can determine that a bounding box 212 with characters forming the word "Career Summary" to be associated with a section type for career summaries. The compute device can determine that bounding boxes (e.g., bounding box 213) below the bounding box 212 to also be associated with that section type and/or determine, based on the text encoding for that bounding box 213, that the bounding box 213 and the subset(s) of characters in that bounding box 213 are also associated with that section type. The compute device can generate the bounding box for the career summary section 211.

In some implementations, the compute device can determine that a bounding box 222 and a bounding box 224 can be indicative of work experience. The compute device can also determine that bounding boxes 223a-c under the bounding box 222 are related to the bounding box 222 and that abounding boxes 224a-224e are related to the bounding box 224. The compute device can generate the bounding box for the work experience section 221.

In some implementations, the compute device can determine that a bounding box 232 as a section title based on a subset(s) of characters in that bounding box 232. The compute device can also determine that bounding boxes 233a-233c include dates representing time period to be associated with a section type of work history. The compute device can also determine that bounding boxes 234a-234c are associated with work history based on the text encoding. As such, the compute device can be configured to generate a bounding box around the bounding box 232, 233a-c, and 234a-c to be associated with the work history section 231.

In some implementations, the compute device can determine that a bounding box 242 is a section title (e.g., "Education") based on a subset(s) of characters in that bounding box 242 and associate that bounding box 242 with the education section 241. The compute device can also determine that a bounding box 243 includes a name of an educational institution and associated that bounding box 243 with the education section 241. The compute device can also determine bounding boxes 244a-d to include educational related information and associate those bounding boxes 244a-d with the education section 241. In some cases, the compute device can generate and/or overlay a bounding box over the bounding boxes associated with the education section 241. In some cases, 244d can include multiple bounding boxes for each word in a line.

Figure 3:
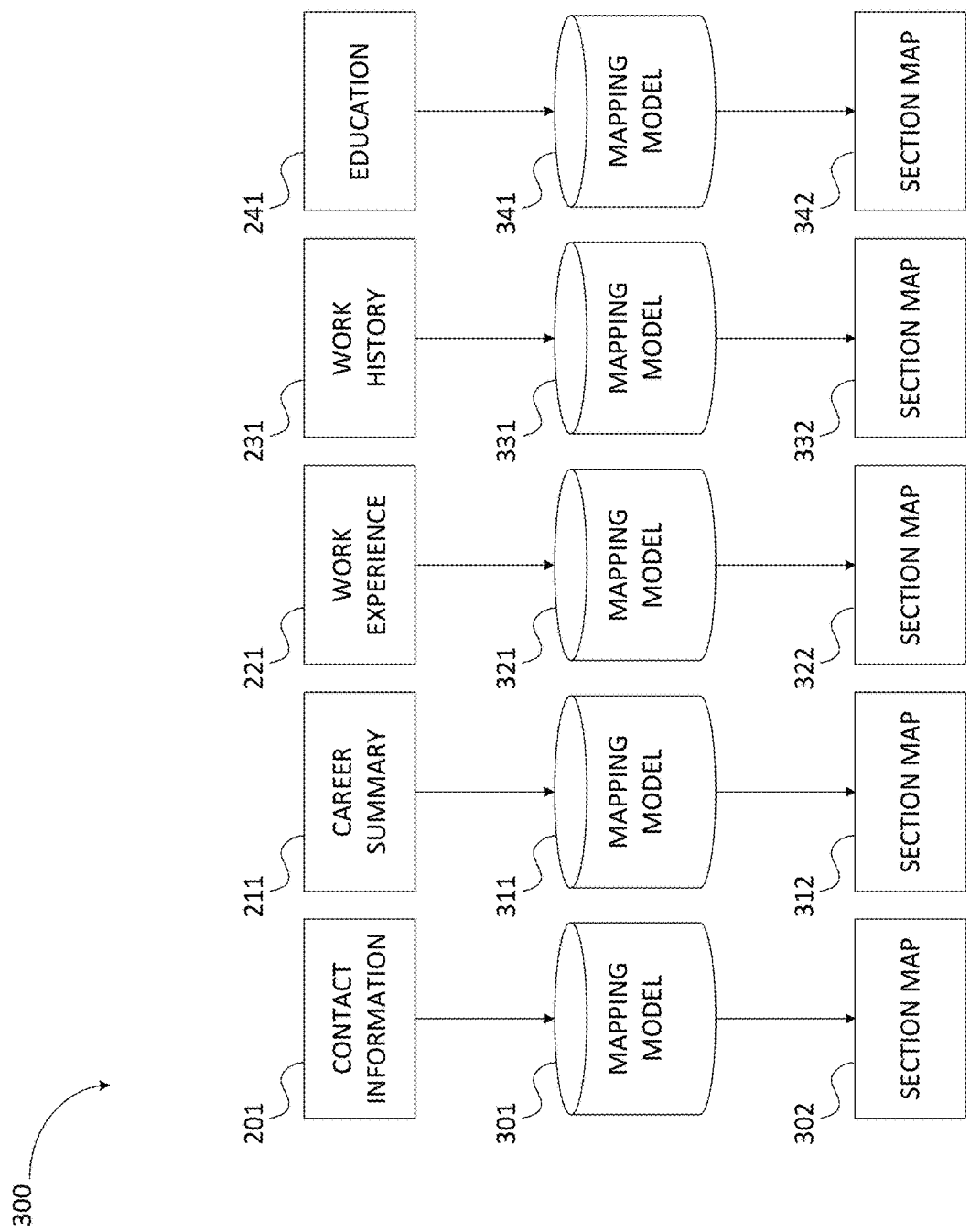
FIG. 3 is a flow diagram of a system for training machine learning models for sections from document images, according to an embodiment.

FIG. 3 is a flow diagram of a system 300 training machine learning models for sections from document images, according to an embodiment. In some implementations, the system 300 can include sections such as, for example, the contact information section 201, the career summary section 211, the work experience section 221, the work history section 231, the education section 241, and/or the like. Each section 201, 211, 221, 231, 241 can be consistent with each section in FIG. 2. Each section can be associated with an mapping machine learning model from a set of mapping machine learning models (e.g., mapping machine learning model 301, 311, 321, 333, 341). In some implementations, the set of mapping machine learning model can be consistent with the set of mapping machine learning models of FIG. 1. Each mapping machine learning model from the set of mapping machine learning models can be trained using training data including information from sections (e.g., contact information section 201, career summary section 211, work experience section 221, work history section 231, education section 241, etc.), to produce a trained mapping machine learning model from a set of trained mapping machine learning models (not shown in FIG. 3).

Each mapping machine learning model can be configured to extract information from one section based on at least a portion of a text encoding and/or at least a portion of a visual encoding from a document image and/or a parsed document as described in FIG. 1 or FIG. 2. In some implementations, one mapping machine learning model can be associated with one section. For instance, the mapping machine learning model 301 can be associated with the contact information section 201 of the resume of document image 200 from FIG. 2 and/or any contact information section of any resume. The mapping machine learning model 311 can be associated with the career summary section 211 of the resume of document image 200 from FIG. 2 and/or any career summary section of any resume. The mapping machine learning model 321 can be associated with the work experience section 221 of the resume of document image 200 from FIG. 2 and/or any work experience section of any resume. The mapping machine learning model 331 can be associated with the work history section 231 of the resume of document image 200 from FIG. 2 and/or any work history section of any resume. The mapping machine learning model 341 can be associated with the education section 241 of the resume of document image 200 from FIG. 2 and/or any education section of any resume. It is important to note that the system 300 is not limited to the sections as described above and can include mapping machine learning models for other sections found in a resume.

In some implementations, the mapping machine learning model 301 can be executed using information in the contact information section 201 to generate a section map 302 for the contact information section 201. In other words, the section map 302 can be or include organized and/or structured information extracted from the contact information section 201.

In some implementations, the mapping machine learning model 311 can be executed using information in the career summary section 211 to generate a section map 312 for the career summary section 211. In other words, the section map 312 can be or include organized and/or structured information extracted from the career summary section 211.

In some implementations, the mapping machine learning model 321 can be executed using information in the work experience section 221 to generate a section map 322 for the work experience section 221. In other words, the section map 322 can be or include organized and/or structured information extracted from the work experience section 221.

In some implementations, the mapping machine learning model 331 can be executed using information in the work history section 231 to generate a section map 332 for the work history section 231. In other words, the section map 332 can be or include organized and/or structured information extracted from the work history section 231.

In some implementations, the mapping machine learning model 341 can be executed using information in the education section 241 to generate a section map 342 for the work education section 241. In other words, the section map 342 can be or include organized and/or structured information extracted from the education section 241. It is important to note that there can be additional machine learning models for additional sections not described herein. In some implementations, each of the mapping machine learning model

301, 311, 321, 331, 341 can be trained with training sets of sections correlated to section maps of multiple resumes and/or document images.

Figure 4:
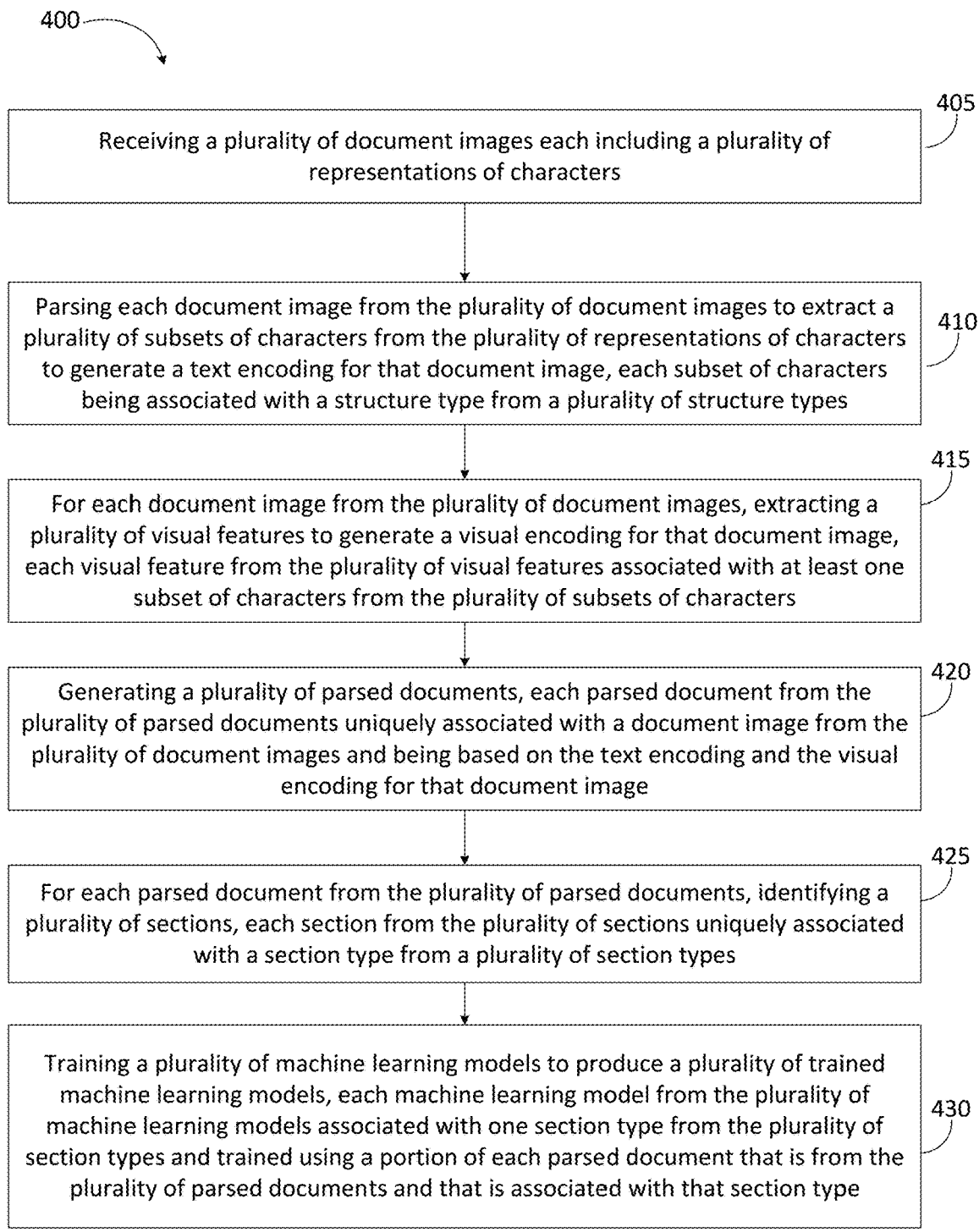
FIG. 4 is a flow diagram of a method for encoding a document image with textual and visual features and training a machine learning mode(s), according to an embodiment.

FIG. 4 is a flow diagram of a method 400 for encoding a document image with textual and visual features and training a machine learning mode(s), according to an embodiment. In some implementations, each step of the method 400 can be performed by a processor at a compute device automatically. At 405, the method 400 includes receiving a set of document images. Each document image includes a set of representations of characters. In some implementations, a document image can be or include a resume of a job candidate. In some implementations, the set of representations of characters can be or include glyphs.

At 410, the method 400 includes parsing each document image from the set of document images to extract subsets of characters from the set of representations of characters to generate a text encoding for that document image. Each subset of characters can be associated with a structure type from a set of structure types. In some implementations, the text encoding can be or include a conversion of the document image into machine readable text. In some implementations, the method 400 includes parsing, via an OCR reader of the compute device, to extract the subsets of characters (e.g., text, words, phrases, numbers, dates, punctuations, etc.) from the set of representations of characters in the document image based on a structure type from a set of structure types and to generate the text encoding for the document image based on the subsets of characters. In some implementations, the text encoding can include a translation of the set of characters in the document image such that the translation is a machine-readable format, such as, for example, ASCII, Unicode, or any other suitable format.

In some implementations, the method 400 can include generating a bounding box from a set of bounding boxes over each subset of characters from extracted from the document image. In some cases, each bounding box can be generated and/or associated with a subset of characters based on a structure type. A bounding box can be or include an area of the document image and or at least a portion of the document image outlining a subset and/or subsets of characters. In some implementations, the bounding box can be or include a dynamic representation of a boundary that is overlayed on the document image. In some cases, the bounding box can be a dimensional outline and/or box that highlights words, dates, phrases, and/or the like. In some implementations, a structure type can describe a subset of characters for each bounding box. For instance, the structure type for a bounding box over a single word can be "word." The structure type for a bounding box over "Work Experience" from the document image can be "section title." The structure type for a bounding box over a bulleted list entry describing job duties/responsibilities can be "bullet entry." For instance, the method 400 can include detecting a bullet point and encoding any subsets of characters, associated with a bounding box or not, following the bullet point and preceded by a period (or multiple white spaces).

In some implementations, the method 400 can include generating bounding boxes prior to extracting textual information (e.g., generating text encoding) from subsets of characters. For instance, the processor can generate bounding boxes over portions of the document image that exclusively include representations of characters. This is so, at least in part, to avoid scanning whitespaces, images, and/or other non-machine recognizable text to reduce computational overhead. In some implementations, the method 400 can include generating bounding boxes in parallel to identifying/extracting subsets of characters. In some implementations, the method 400 can include generating bounding boxes over subsets of characters after extracting the subsets of characters. This is so, at least in part, to improve extracting of textual information of characters in the bounding boxes instead of arbitrarily extracting data of each pixel in a document image.

At 415, the method 400 includes, for each document image from the set of document images, extracting a set of visual features to generate a visual encoding for that document image, each visual feature from the set of visual features associated with at least one subset of characters from the subsets of characters. The visual encoding can be or include translations of visual information into machine-readable information such as, for example, text and/or values. For instance, a visual encoding of a document image can include a set of visual features that describe visual information extracted in the document image. A visual feature can be or include structured and/or labeled visual information extracted from document image and incorporated into a visual feature mapping of a visual encoding. For instance, a visual encoding can include a set of visual feature mappings where each visual feature mapping from the set of visual feature mappings can include a visual feature types from a set of predefined visual feature types mapped to a visual feature from a set of visual features. In some cases, the visual features can include data in the form of text and/or value describing, for example, text alignment (e.g., left, right, centered, justified, etc.), line spacing, character spacing, location (e.g., pixel coordinates) of text on the document image, and/or the like, for the subsets of characters and/or subsets of characters in bounding boxes. The visual features can also describe whitespace, amount of pixels from all sides of margins of a document image, dimension of characters (or subset of characters), dimension of bounding boxes, and/or the like. The visual features can also describe stylistic information about characters such as, for example, boldness, italics, underlines, font, font size, and/or the like. For example, a visual encoding can include a visual feature mapping for line spacing that can include a visual feature type for line spacing mapped to a visual feature of double spacing. In another example, a visual encoding can include a visual feature mapping for a detected font that can include a visual feature type for a font mapped to a visual feature of Times New Roman. In some cases, the processor 102 can pre-define the visual feature types, scan each document image to extract visual information, encode the visual information to a visual feature, and tag the visual feature to an appropriate visual feature type, to generate a visual feature mapping. Multiple visual feature mappings can form the visual encoding of that document image. In other words, the visual encoding can be or include translations of visual information, which include encoded visual features, in a machine-readable and semantically comprehensible format.

The visual encoding can include a machine-readable translation of character sequences unlikely to appear in natural language, such as "[*" and "*]" such that visual encodings are not mistaken for textual information when subjected to further processing or analysis as described in further detail herein. For example, the visual encoding can include a machine-readable translation of double spacing of lines as "[*2.0*]". In another example, a visual feature mapping of a visual encoding can include a machine-readable translation of a detected font such as "[font='Times New Roman']". In another example, a visual feature mapping of a visual encoding can include a machine-readable translation for bolded text to include an opening tag [b] and a closing tag [/b]. In another example, a visual feature mapping of a visual encoding can include a machine-readable translation for a color of text such as "[color='black']".

At 420, the method 400 includes generating a set of parsed documents. Each parsed document from the set of parsed documents can be uniquely associated with a document image (e.g., document image 120) from the set of document images and being based on the text encoding and the visual encoding for that document image. In other words, the parsed document can include a version of the document image such that the parsed document includes textual information and visual information extracted from the document image 120.

At 425, the method 400 includes for each parsed document from the set of parsed documents, identifying a set of sections. Each section from the set of sections can be uniquely associated with a section type from a set of predefined section types. In some implementations, the section type can be, for example, a section in a resume that contains information about specific information about the job candidate. For instance, the section type can include work experience, education, awards, certifications, work history, references, career summary, contact information, hobbies, skills, headshot, and/or the like. In some implementations, the processor 102 can be caused to update the predefined set of section types with new section types. In some implementations, the method 400 can include training a section machine learning model(s) to classify and/or identify portions of each parsed document as a section based on a uniquely associated section type. In some cases, the single section machine learning model can also be trained to determine which section types are present in each parsed document.

At 430, the method 400 includes, training a set of machine learning models to produce a set of trained machine learning models. Each machine learning model from the set of machine learning models can be associated with one section type from the set of section types and trained using a portion of each parsed document that is from the set of parsed documents and that is associated with that section type.

In some implementations, the method 400 can include training the set of machine learning models (e.g., set of mapping machine learning models) using training sets that include text encodings and visual encodings from multiple document images to accurately interpret and/or extract data from that each section in each document image. For instance, in a section titled "Work Experience," the section can include a word such as "AWS" intended to describe place of work. The section can also include words such as "AWS engineer" intended to describe job title. AWS can stand for Amazon Web Service®. In some cases, AWS can also be a certification or a type of engineer (e.g., an engineer that uses AWS). An mapping machine learning model associated with the section titled "Work Experience" can be trained to recognize that the word "AWS" opposed to "AWS engineer" is the place of work and that "AWS engineer" is the job title. In some cases, a job candidate can be employed at a different company than AWS such as, for example, Capital One®. The job candidate can have a job title of AWS engineer at Capital One®. Based on information from a portion of a text encoding and a portion of a visual encoding from the parsed document for the words of "Capital One®" and "AWS engineer" in the section, that mapping machine learning model associated with that section can recognize that the place of work of the job candidate is Capital One® while the job position of the job candidate is AWS engineer without confusion.

Figure 5:
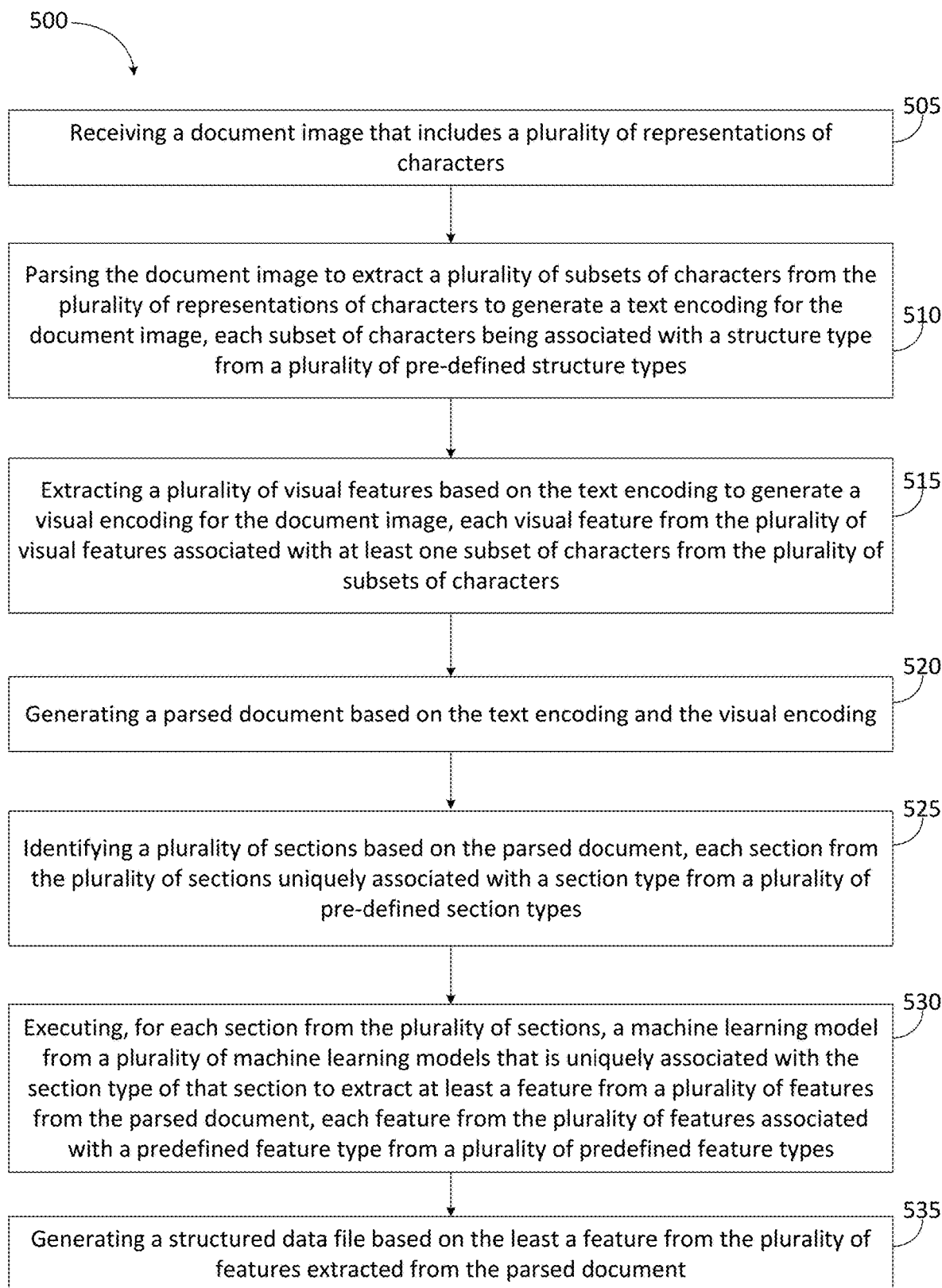
FIG. 5 is a flow diagram of a method for encoding a document image with textual and visual features and executing a machine learning model(s) to extract relevant data points, according to an embodiment.

FIG. 5 is a flow diagram of a method 500 for executing a machine learning model(s) to produce encoded document image with textual and visual features, according to an embodiment. In some implementations, after training the set of machine learning models in 425 of method 400 of FIG. 4. In some implementations, each step from the method 500 can be performed automatically via a processor. At 505, the method 500 includes receiving, at a processor of a compute device, a document image (e.g., different from the document image(s) used to train the set of machine learning models of FIG. 4) that includes a set of representations of characters. The set of representations of characters can include, for example, glyphs.

At 510, the method 500 includes parsing the document image to extract subsets of characters from the set of representations of characters based on a structure type from a set of predefined structure types and to generate a text encoding for that document image based on the subsets of characters.

At 515, the method 500 includes extracting a set of visual features based on the text encoding to generate a visual encoding for the document image. Each visual feature from the set of visual features can be associated with at least one subset of characters from the subsets of characters.

At 520, the method 500 includes generating a parsed document based on the text encoding and the visual encoding. In other words, the parsed document can be or include a version of the document image containing extracted (or encoded) textual information and visual information.

At 525, the method 500 includes identifying a set of sections based on the parsed document, each section from the set of sections uniquely associated with a section type from a set of predefined section types. The section type from the predefined section types can be consistent with any section type as described herein.

At 530, the method 500 includes executing, for each section from the set of sections, a machine learning model from a set of machine learning models that is uniquely associated with the section type of that section to extract at least a feature from a set of features from the parsed document. Each feature from the set of features can be associated with a feature type from a set of predefined feature types. For instance each feature from the set of features can be a section feature from a set of section features. In some implementations, each section feature from the set of section features can be associated with a predefined section feature type from a set of predefined section feature types. In some instances, a section feature type from the set of predefined section feature types can be or include a category of features and/or data extracted from the parsed document, such as, for example, first name, last name, institution of education, degree, skills, company name, job title, and/or the like. Section features can be, for example, identified, translated, extracted, and/or mapped data associated with the predefined feature types. For instance, the parsed document can include a job title of "business analyst" which would correlated (or labeled) to a predefined feature type of job title. In some implementations, the method 500 can include mapping the extracted section features to the predefined section feature types to produce a set of section feature mappings.

In some implementations, the method 500 can include executing each machine learning model to generate a section map including a set of section feature mapping for the section type uniquely associated with each machine learning model. The section map can be or include a set of section feature mappings where each section feature mapping from the set of section feature mappings includes section features translated, extracted, identified, and/or mapped from a section of the parsed document and mapped to a section feature type from a set of predefined section feature types. A section map can be associated with one section type from the set of predefined section types. A section feature type from a set of predefined section feature types can be or include an encoded label from a section type from a set of predefined section types. A section feature can be or include an translated, extracted, identified, and/or mapped information for a correlated section feature type. For example, predefined section feature types associated with a contact information section can include "first name," "last name." "full name," "email," "phone number," "Linkedin®," and/or the like. In some implementations, the section map associated with that contact information section can include section feature mappings of predefined section feature types to section features such as, for example, "'first name': 'John'", "'last name': 'Smith'", "'full name: 'John Smith'", "'email': 'johnsmith@gmail.com'", and/or the like. The structured data file can include section maps where each section map including section feature mappings. In some implementations, an mapping machine learning model associated with an education section can be configured to extract section features from the education section of the parsed document and generate the section map for the education section. In some cases, the section map for the education section can include section feature mappings such as, for example, a college name mapped to the college attended by a job candidate of the parsed document.

At 535, the method 500 includes generating a structured data file based on the least a feature from the plurality of features extracted from the parsed document. The at least a feature from plurality of features can be or include features identified, translated, extracted, and/or mapped from portions of the parsed document (including text encoding and visual encoding). For instance, the structured data file can include a set of section maps generated from the set of machine learning models, where each section map from the set of section maps includes a set of section feature mappings associated with one section type from the set of predefined section types. In some cases, the structured data file can be or include a JSON file. In some implementations, the structured data file can include the set of section feature mappings with feature mappings such that each feature mapping from the set of feature mappings includes a predefined feature type mapped to a feature extracted from the parsed document. In some implementations, section feature types (e.g., categories) of the section feature mappings can be predefined such that the set of machine learning models can map extracted features for those predefine feature types (e.g., categories).

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R. DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape: optical storage media such as Compact Disc/Digital Video Discs (CD/DVDs), Compact Disc-Read Only Memories (CD-ROMs), and holographic devices: magneto-optical storage media such as optical disks: carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B): in another embodiment, to B only (optionally including elements other than A): in yet another embodiment, to both A and B (optionally including other elements): etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B): in another embodiment, to at least one, optionally including more than one, B, with no A present (and optionally including elements other than A): in yet another embodiment, to at least one, optionally including more than one, A, and at least one, optionally including more than one, B (and optionally including other elements): etc.

In the embodiments, as well as in the specification above, all transitional phrases such as "comprising." "including." "carrying," "having," "containing," "involving." "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, processor-readable medium storing instructions that executed by a processor, cause the processor to:
   receive a plurality of document images each including a plurality of representations of characters:
   parse each document image from the plurality of document images to extract a plurality of subsets of characters from the plurality of representations of characters to generate a text encoding for that document image, each subset of characters being associated with a structure type from a plurality of structure types;
   for each document image from the plurality of document images, extract a plurality of visual features to generate a visual encoding for that document image, each visual feature from the plurality of visual features associated with at least one subset of characters from the plurality of subsets of characters;
   generate a plurality of parsed documents, each parsed document from the plurality of parsed documents uniquely associated with a document image from the plurality of document images and being based on the text encoding and the visual encoding for that document image;

for each parsed document from the plurality of parsed documents, identify a plurality of sections, each section from the plurality of sections uniquely associated with a section type from a plurality of section types; and train a plurality of machine learning models to produce a plurality of trained machine learning models, each machine learning model from the plurality of machine learning models associated with one section type from the plurality of section types and trained using a portion of each parsed document that is from the plurality of parsed documents and that is associated with that section type.

2. The non-transitory, processor-readable medium of claim 1, wherein the instructions to cause the processor to parse each document from the plurality of documents further comprises instructions to cause the processor to:

define a bounding box associated with at least one of a word, phrase, date, time, or sentence, a subset of characters from the plurality of subset of characters being associated with the bounding box.

3. The non-transitory, processor-readable medium of claim 1, wherein the instructions to cause the processor to parse each document from the plurality of documents further comprises instructions to cause the processor to:

define a bounding box associated with at least one of a word, phrase, date, time, or sentence, a subset of characters from the plurality of subset of characters being associated with the bounding box, and a visual feature from the plurality of visual features being associated with the bounding box.

4. The non-transitory, processor-readable medium of claim 1, wherein each trained machine learning model from the plurality of trained machine learning models is configured to extract at least a feature from the section type that is uniquely associated with that trained machine learning model.

5. The non-transitory, processor-readable medium of claim 1, wherein each trained machine learning model from the plurality of trained machine learning models is configured to:

extract at least a feature from the section type that is uniquely associated with that trained machine learning model; and populate a structured data file with the feature extracted by that trained machine learning model.

6. The non-transitory, processor-readable medium of claim 1, the instructions further comprising instructions configured to cause the processor to:

receive a first document image that is not from the plurality of document images;

identify a first section in the first document image that is uniquely associated with a section type from the plurality of section types; and apply a first trained machine learning model from the plurality of trained machine learning models to the first section in the first document image to produce at least a portion of a structured data file that identifies a feature of the first section in the first document.

7. The non-transitory, processor-readable medium of claim 1, wherein the instructions to cause the processor to train the plurality of machine learning models further includes instructions to train at least one machine learning model from the plurality of machine learning models to:

extract a feature from the section type that is uniquely associated with that trained machine learning model; and generate a confidence score associated with the feature extracted from the section type.

8. The non-transitory, processor-readable medium of claim 1, the instructions further comprising instructions configured to cause the processor to:

receive a first document image that is not from the plurality of document images:

identify a first section in the first document image that is uniquely associated with a first section type from the plurality of section types;

identify a second section in the first document that is uniquely associated with a second section type from the plurality of section types;

apply a first trained machine learning model from the plurality of trained machine learning models to the first section in the first document image to produce at least a first portion of a structured data file that identifies a feature of the first section in the first document; and apply a second trained machine learning model from the second plurality of trained machine learning models to the second section in the first document image to produce at least a second portion of the structured data file that identifies a feature of the second section in the first document.

9. A non-transitory, processor-readable medium storing instructions that executed by a processor, cause the processor to:

receive a document image that includes a plurality of representations of characters;

parse the document image to extract a plurality of subsets of characters from the plurality of representations of characters to generate a text encoding for the document image, each subset of characters being associated with a structure type from a plurality of predefined structure types;

extract a plurality of visual features based on the text encoding to generate a visual encoding for the document image, each visual feature from the plurality of visual features associated with at least one subset of characters from the plurality of subsets of characters;

generate a parsed document based on the text encoding and the visual encoding;

identify a plurality of sections based on the parsed document, each section from the plurality of sections uniquely associated with a section type from a plurality of predefined section types;

execute, for each section from the plurality of sections, a machine learning model from a plurality of machine learning models that is uniquely associated with the section type of that section to extract at least a feature from a plurality of features from the parsed document, each feature from the plurality of features associated with a predefined feature type from a plurality of predefined feature types; and generate a structured data file based on the least a feature from the plurality of features extracted from the parsed document.

10. The non-transitory, processor-readable medium of claim 9, the instructions further comprising instructions to cause the processor to:

generate a score for each feature from the plurality of features from the structured data; and remove a feature from the plurality of features based on the score for that feature being below a predetermined threshold.

11. The non-transitory, processor-readable medium of claim 9, the instructions further comprising instructions to cause the processor to train the plurality of machine learning models.

12. The non-transitory, processor-readable medium of claim 9, the instructions further comprising instructions to cause the processor to:
receive a plurality of training document images;
for each training document image from the plurality of training document images, identify at least one section associated with at least one section type from the plurality of predefined section types; and
train a first machine learning model from the plurality of machine learning models that is associated with a first predefined section type from the plurality of predefined section types with a using data from the training document images that are associated with the first predefined section type.

13. The non-transitory, processor-readable medium of claim 9, the instructions further comprising instructions to cause the processor to:
receive a plurality of training document images;
for each training document image from the plurality of training document images, identify at least one section associated with at least one section type from the plurality of predefined section types;
for each training document image from the plurality of training document images having a first predefined section type from the plurality of predefined section types, extract, from the first section type a text encoding and a visual feature associated with at least a portion of the text encoding; and
train a first machine learning model from the plurality of machine learning models that is associated with the first predefined section type from the plurality of predefined section types with the text encoding and the visual feature.

14. The non-transitory, processor-readable medium of claim 9, wherein the document image is a resume.

15. The non-transitory, processor-readable medium of claim 9, wherein the structured data file is a JSON file.

16. The non-transitory, processor-readable medium of claim 9, wherein the instructions to cause the processor to execute, for each section from the plurality of sections, a machine learning model from a plurality of machine learning models further includes instructions to cause the processor to extract a first feature from the plurality of features from a first section type using a first machine learning model and extract a second feature from the plurality of features from a second section type using a second machine learning model.

17. The non-transitory, processor-readable medium of claim 9, wherein the instructions to cause the processor to:
execute, for each section from the plurality of sections, a machine learning model from a plurality of machine learning models further includes instructions to cause the processor to extract a first feature from the plurality of features from a first section type using a first machine learning model and extract a second feature from the plurality of features from a second section type using a second machine learning model; and
generate the structured data file further includes instructions to cause the processor to include the first feature and the second feature in the structured data file.

18. The non-transitory, processor-readable medium of claim 9, wherein the instructions to cause the processor to:
execute, for each section from the plurality of sections, a machine learning model from a plurality of machine learning models further includes instructions to cause the processor to extract a first feature from the plurality of features from a first section type using a first machine learning model and extract a second feature from the plurality of features from a second section type using a second machine learning model; and
generate the structured data file further includes instructions to cause the processor to include the first feature in the structure data file associated with a first section feature mapping and the second feature in the structured data file associated with a second section feature mapping.

19. The non-transitory, processor-readable medium of claim 9, wherein the instructions to cause the processor to:
execute, for each section from the plurality of sections, a machine learning model from a plurality of machine learning models further includes instructions to cause the processor to extract a first feature from the plurality of features and a second feature from the plurality of features from a first section type using a first machine learning model; and
generate the structured data file further includes instructions to cause the processor to include the first feature and the second feature in the structured data file.

20. An apparatus, comprising:
a processor; and
a memory operatively connected to the processor, the memory storing instructions to cause the processor to:
receive a plurality of document images, each document image from the plurality of document images including a plurality of representations of characters;
for each document image from the plurality of document images:
parse that document image to extract a plurality of subsets of characters from the plurality of representations of characters to generate a text encoding for that document image,
each subset of characters from the plurality of subsets of characters being associated with a structure type from a plurality of structure types and to generate a text encoding for that document image based on the plurality of subsets of characters;
for each document image from the plurality of document images, extract a plurality of visual features to generate a visual encoding for that document image, each visual feature from the plurality of visual features associated with at least one subset of characters from the plurality of subsets of characters;
generate a plurality of parsed documents, each parsed document from the plurality of parsed documents uniquely associated with a document image from the plurality of document images and based on the text encoding and the visual encoding for that document image;
for each parsed document from the plurality of parsed documents, identify a plurality of sections, each section from the plurality of sections uniquely associated with a section type from a plurality of section types; and
train a plurality of machine learning models to produce a plurality of trained machine learning models, each machine learning model from the plurality of machine learning models associated with one section type from the plurality of section types and trained using a portion of each parsed document from the plurality of parsed documents, the portion of each parsed document associated with that section type.

21. The apparatus of claim 20, the memory further storing instructions to cause the processor to execute the plurality of trained machine learning models on a document image that is not from the plurality of document images.

* * * * *